US005495606A

United States Patent [19]
Borden et al.

[11] Patent Number: 5,495,606
[45] Date of Patent: Feb. 27, 1996

[54] SYSTEM FOR PARALLEL PROCESSING OF COMPLEX READ-ONLY DATABASE QUERIES USING MASTER AND SLAVE CENTRAL PROCESSOR COMPLEXES

[75] Inventors: Terry L. Borden, Poughkeepsie; William K. Kelley, Wappingers Falls, both of N.Y.; Iderpal S. Narang, Saratoga, Calif.; Bharat D. Rathi, Cortlandt Manor, N.Y.; David J. Wisneski, Morgan Hill, Calif.

[73] Assignee: International Business Machines Corporation, Armonk, N.Y.

[21] Appl. No.: 148,091

[22] Filed: Nov. 4, 1993

[51] Int. Cl.$^6$ ............................ G06F 17/30; G06F 15/17
[52] U.S. Cl. ................... 395/600; 364/230.4; 364/229.4; 364/DIG. 1; 364/282.4
[58] Field of Search ...................................... 395/600, 650, 395/200; 364/228.1, 228.5, 228.7, 229.4, 230.4, 230.5, 282.4

[56] References Cited

U.S. PATENT DOCUMENTS

| | | | |
|---|---|---|---|
| 4,876,643 | 10/1989 | McNeill et al. | 364/200 |
| 5,228,127 | 7/1993 | Ikeda et al. | 395/200 |
| 5,247,664 | 9/1993 | Thompson et al. | 395/600 |
| 5,317,731 | 5/1994 | Diaz et al. | 395/600 |
| 5,329,628 | 7/1994 | Yamamoto | 395/425 |

OTHER PUBLICATIONS

Francett, "Business Community Primes for Parallel; Hardware, Software Suppliers Pushing Parallel Database as Commercial Entree", Software Magazine, vol. 13, No. 10, p63(6), Jul. 1993.
Fuller, "When Transaction Processing Won't Help . . . ", Computing Canada, vol. 18, No. 20, p38(1), Sep. 28, 1992.
Bandrowski, "Smarter Quick Response—Exploiting the Data You Have", Corporate Computing, vol. 1, No. 3, p. 214(3), Sep. 1992.
GA23–0383–01 "Introducing Enterprise Systems Connection" 1990, 1991.
GC26–4073–3 "IBM Database 2" General Information Manual, 1987.
GC28–1092–01 "IBM SystemView Automated Operations Control/MVS" Overview—Release 2 1991, 1993.
GC27–9118–01 IBM "NewView Solutions—Automated Network Operations/MVS—General Information Ver. 1/Rel 2" 1991–1992.
"Parallel Database Processing on the KSRI Computer" by E. Tseng & D. Reiner, 1993, Association of Computer Machinery—pp. 453–455.
"Power for the People" by W. Schatz—Information Week—Sep. 13, 1993, pp. 40–41.
"October Surprise" by R. Moran, Information Week—Aug. 30, 1993—pp. 12–13.
"The Kendall Square Query Decomposer" by D. Reiner, Kendall Square Research Corporation, pp. 36–37, 1993.
"Factoring—A Method for Scheduling Parallel Loops" by S. F. Hummel, et al., Communications of the ACM Aug. 1992, vol. 35, No. 8, pp. 90–101.

*Primary Examiner*—Thomas G. Black
*Assistant Examiner*—Jack M. Choules
*Attorney, Agent, or Firm*—Michaelson & Wallace; Lawrence D. Cutter; William B. Porter

[57] ABSTRACT

A parallel query processing system comprises a front end processor, a query processing complex attached to the front end processor, and a database on a data repository attached by a first path to the front end processor, and by one or more additional paths to one or more slave processors within the query processing complex. An external operations command processor within the front end processor quiesces database managers in the slave processors to permit maintenance operations by the front end processor, and restarts the slave processors in read-only mode after maintenance operation completion. A splitter/scheduler function in a master processor within the query processor complex receives complex read-only queries from the front end processor, splits them into query elements, schedules the query elements for execution on the slave processors and recombines the execution results to be sent back to the front end processor.

10 Claims, 8 Drawing Sheets

SYSTEM FOR PARALLEL PROCESSING OF COMPLEX READ-ONLY DATABASE QUERIES USING MASTER AND SLAVE CENTRAL PROCESSOR COMPLEXES

BACKGROUND OF THE INVENTION

1. Field of the Invention

This invention relates to a computer-implemented database system. More specifically, it relates to a decision support system comprising a highly-parallel database-processing multiple-computer system designed for high-speed searching and retrieval of information from a relational or hierarchical database.

2. Discussion of the Background

Database systems have generally employed a single general purpose computer system and a database management system (DBMS) for searching and retrieving information from a relational or hierarchical database.

An important class of database systems is called a transaction processing system. This class of database system processes query or update transactions against a database, the transactions being submitted by end users, usually from remote terminals. Such systems must often support a large number of randomly occurring requests where the response time to the request is an important factor in the level of service provided to the end users. Examples of such transaction processing systems include systems that support automated bank teller machines and airlines reservation systems.

Another important class of database systems is called a decision support system. This class of database system processes query transactions against a database, the transactions being submitted by end users, usually from remote terminals. Such systems may support fewer requests than transaction processing systems, but the decision support requests tend to be more data-intensive and expensive to process because they often require searching large portions of the database in contrast to transaction processing systems queries that are usually concerned with a single account or flight record.

A decision support query, for example, might request the average salary of all employees in the company having a specified grade level. Such a query may result in searching all the employee records to find the matching grade level and then extracting the salary information only from those records to include in the average. Another example of a decision support query would be to provide a count of the number of vehicles in the company fleet, categorized by vehicle type and home location.

Decision support applications are important because they provide a way to draw meaningful aggregate information from large databases. Such aggregations of information are important for trend analysis, capacity planning and similar applications.

There are three important factors in decision support systems that are relevant to the present invention:
1. decision support queries require sweeping searches across the database;
2. decision support queries require extracting information from the database, not updating of information;
3. good service to the end user requires fast response time to the query.

Factor 1 implies that an individual decision support query may require a large amount of database search activity. Coupled with factor 3, this means that decision support systems often employ processors dedicated to such processing, the use of multiprocessors for more processing capacity and parallel execution capabilities, or both of the above.

Factor 2 is important because higher performance can be achieved in a system dedicated to processing read-only queries by avoiding the overhead processing required for providing database coherence in the face of concurrent database updates.

SUMMARY OF THE INVENTION

The present invention provides a decision support system with the following characteristics:
1. A separate query processor complex that attaches to a front-end system to enhance parallelism.

The query processor complex operates as a stand-alone database manager that is added to an existing database system as a performance booster. The query processor complex contains one or more loosely-coupled central processing complexes (CPCs), each executing independently its own database management system (DBMS). Each CPC may itself be a tightly-coupled multiprocessor. Such a configuration provides a scalable query processor complex of one or more CPCs. The use of multiple CPCs rather than a higher degree of tightly-coupled multiprocessing lessens the performance-robbing "large system effects" of such systems caused by internal serialization delays and long-queue processing.

2. Query splitter and scheduler functions.

The query splitter and scheduler provide an additional performance boost by parallelizing the individual queries so that the resulting multiple split queries can be processed concurrently on the multiple CPCs. Query splitting and the consequent parallel processing shortens the response time for individual queries more than the use of multiprocessors where each handles unsplit queries.

3. A read-only, shared-data configuration.

Configuring the database to be read-only and providing access to the entire database from any processor and any database management system in the query processor complex provides additional performance benefits. The first performance boost is provided by the lack of the overhead processing associated with serializing access across multiple systems which would be required for a system that allowed concurrent updates to occur (that is, operating in read-write mode, rather than read-only mode). The serializing must be provided even for readers in a read-write mode system to assure that the readers access a coherent version of the data. In a read-only system, no serialization of access is required.

The shared access to the entire database from any processor in the query processor complex provides another performance boost because all the processors and all of the database management systems can process any query against the database; there are no processing or queueing delays such as may be experienced in a system where the database is partitioned such that only certain processors can access certain parts of the database. In effect, all the processors and all of the database management systems in the query processor complex form a multiserver, the most efficient queueing method for processing random transactions.

BRIEF DESCRIPTION OF THE DRAWINGS

Our detailed description explains this invention, together with advantages and features, by way of example with reference to the following drawings.

DETAILED DESCRIPTION OF THE INVENTION

Figure 1:
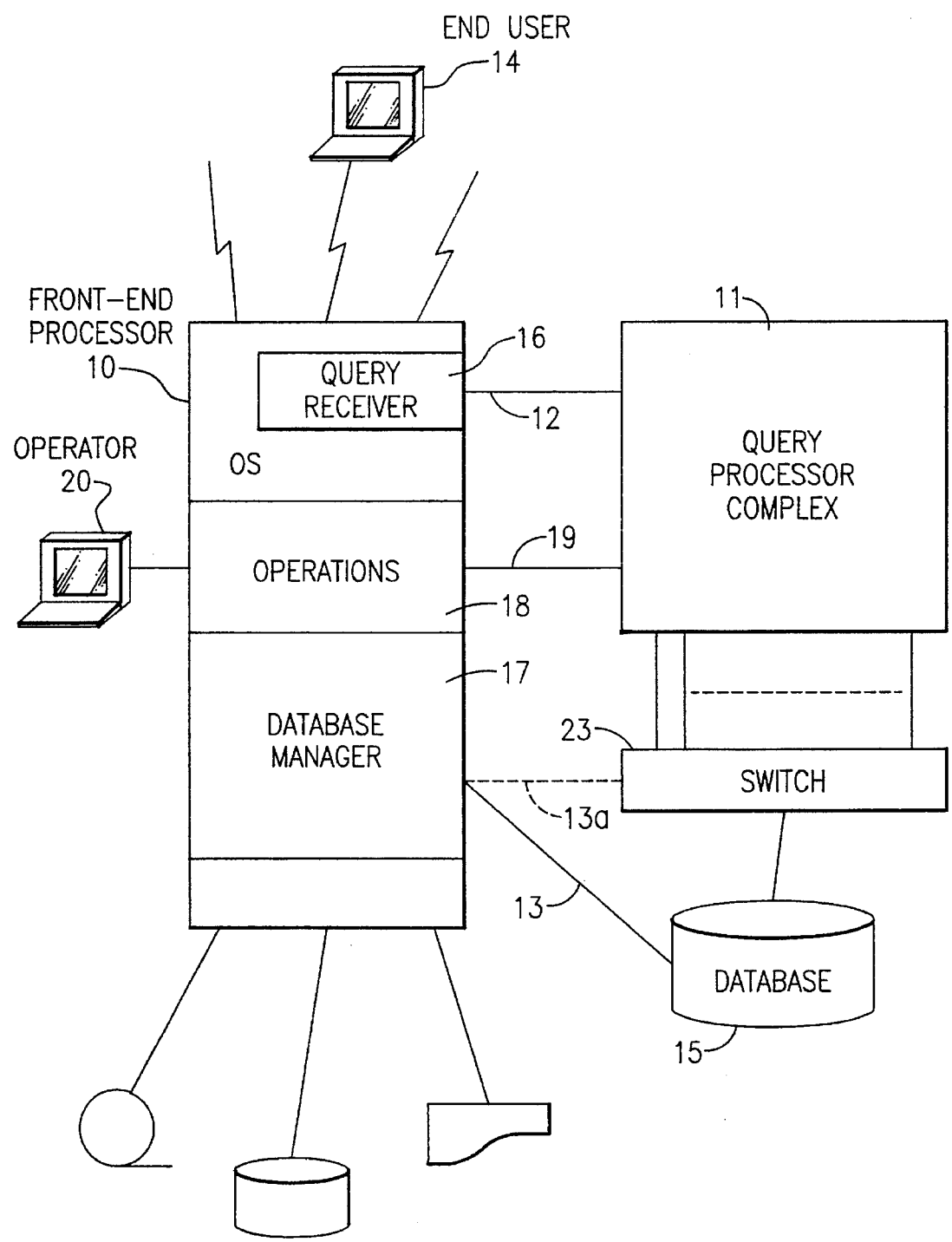
FIG. 1 is a system structure diagram showing schematically an overview of key system elements and particularly shows a highly parallel query processor complex coupled to a database storage and a host front-end system which communicates with end users of the system.

The invention comprises a functionally-focused query processor complex (11) attached to one or more front-end systems (10). At least one of the front-end systems contains a database manager (17) such as the IBM DATABASE 2 (DB2) relational-database manager. The front-end system (10) performs two distinct functions:
1. operator command processing (18) to control system operation and in particular, enter and exit maintenance mode;
2. is the source of database queries (16) for the query processor complex (11) that performs the parallel searching of the database.

If there are more than one front-end systems, only one contains the external operations command processor (item 1 above) while all can serve as sources of database queries for the query processor complex (item 2 above).

The single purpose of the query processor complex (11) is to process database queries submitted by end users (14) or application programs from the front-end system and return the resulting answer sets to the requester. In the query processor complex, the database queries are split into multiple queries that are processed in parallel for improved performance.

It will be understood by those skilled in the art that the query processor complex can be configured in various ways, subject to the following constraints. The query processor complex comprises one or more central processing complexes (CPCs), each controlled by its own operating system. If the query processor complex contains a single CPC, then that CPC must be at least a two-way multiprocessor system to gain the benefits of query splitting. If there are two or more CPCs in the query processor complex, then each CPC may be either a uniprocessor or a multiprocessor. The maximum number of CPCs in a query processor complex is limited only by the connectivity constraints of the CPCs used.

Figure 2:
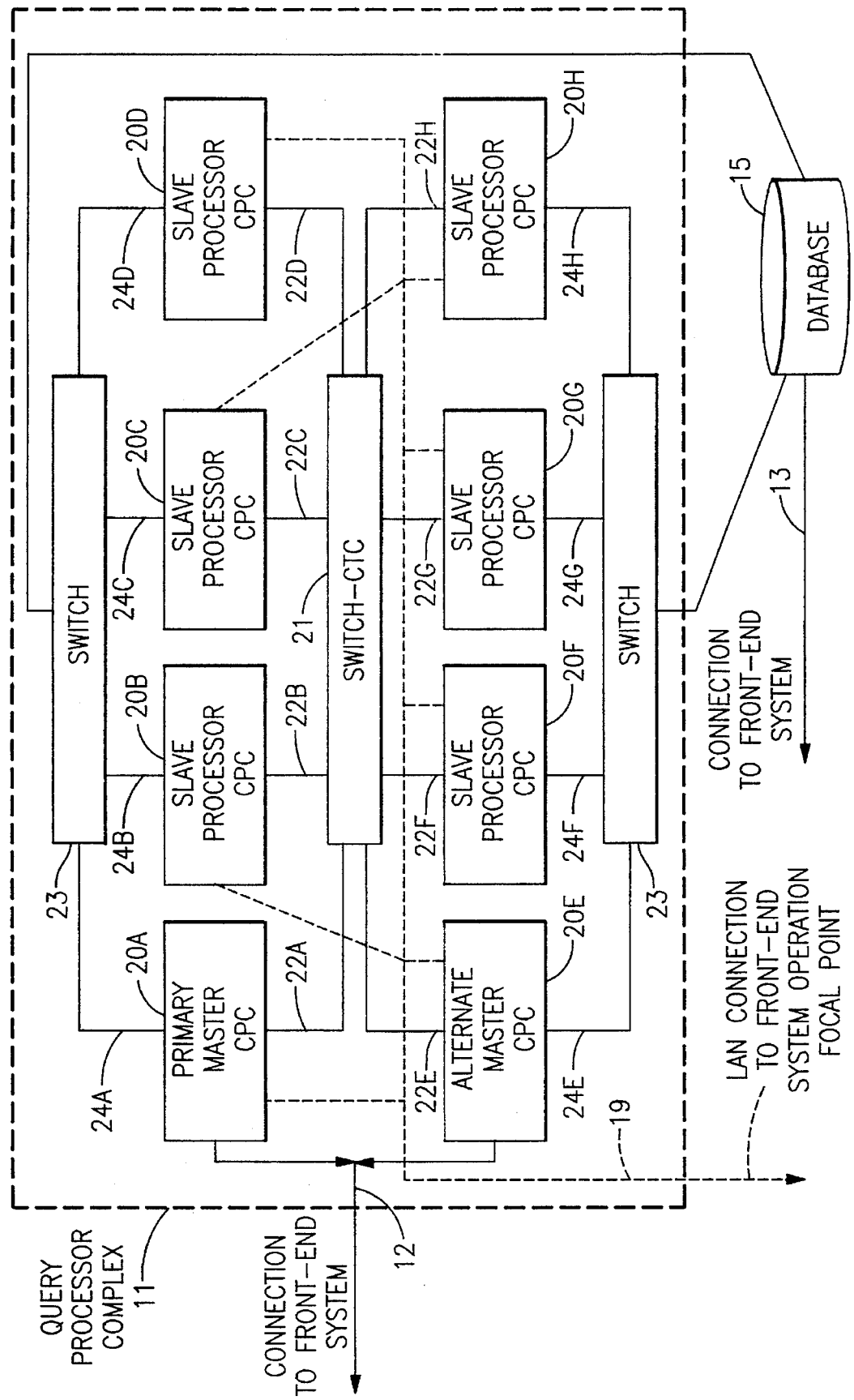
FIG. 2 is a block diagram showing the hardware structure of the query processor complex of FIG. 1 in more detail.

While the embodiment shown in FIG. 2 contains two query processor complex CPCs connected to the front-end system, those skilled in the art will recognize that any or all of the CPCs in the query processor complex could be connected to the front-end system with the addition of the appropriate high-speed channel connections. Those skilled in the art will readily realize that backup on functional redundancy is not essential for basic operation. Thus, only one query processor complex CPC need be connected to the front-end system, in which case element (20E) would be absent from the system configuration of FIG. 2.

It also will be evident to those skilled in the art that while we show the end user's terminals attached to and communicating with the front-end system, these users could be directly attached to and communicate with one or more of the query processor complex CPCs.

It also will be evident to those skilled in the art that while the embodiment shown in FIG. 2 contains a local area network (LAN) being used for the purpose of hardware operations of the query processor complex, any type of communications connection could be used for the same purpose.

FIG. 2 shows the hardware structure of a query processor complex having eight systems (22A–22H), each of which may be a multiprocessor system. This complex of systems is connected to the front-end system(s) via high-speed channel connections (12). In this, for example, the high-speed channel connections are fiber optic data channels that implement the IBM Enterprise Systems Connection (ESCON) architecture, implemented on current IBM mainframe systems (see, for example, *ESCON Introduction*, IBM publication number GA23-0383). These high-speed channel connections are used to:
1. convey queries to the query splitter function (FIG. 3 at 31) in the master processor (20A) of the query processor complex (11) from the query receiver (16) in the front-end processor (10) and convey answers back to the front-end from the query processor complex;
2. provide communications between front-end external operations command processor (18) and command processing internal to the query processor complex (80).

In addition, the central processing complexes (CPCs) (20A–20H) in the query processor complex (11) are connected together via:
1. high-speed channel connections (22A–22H) for the purpose of distributing database queries for processing in parallel and for collecting the resulting answers;
2. a connection, for example a conventional local Area Network (LAN) (19), for the purpose of hardware operations of the query processor complex (10).

Turning to FIG. 2, two of the CPCs (20A, 20E) in the query processor complex of this embodiment are configured to have more high speed channels than the others. In this embodiment, these two CPCs are the only ones with high-speed channel connections to the front-end systems. These two query processor complex CPCs are called the primary and alternate master CPCs. The master query processor is the only CPC in the query processor complex that communicates with the front-end processor about database queries. The master query processor is the receiver of database queries from the front-end processor (10) and is the returner of the resulting answer sets to the front-end processor.

The master query processor in this embodiment also contains the query-splitter (31). While the query splitter needs to be able to communicate with the front-end system, those skilled in the art will understand that the query splitter function may reside in any or all the CPCs of the query processor complex, given that the CPC has the required high-speed channel connection to the front-end system. The query-splitter processes the database query received from the front-end system to split it, if possible, into multiple, simpler queries and passes the split queries on to the scheduler. The scheduler (33) is also contained in the master query processor in this embodiment, but those skilled in the art will understand that the scheduler function does not have to reside in the master processor. The scheduler (33) schedules the split queries for processing in parallel on the various CPCs of the query processor complex and sends the split queries to the server tasks (32B–32H) on the designated slave query processors. The purpose of having two CPCs that are capable of having the front-end connection is to provide redundancy and backup capability for the query splitting code (31), the scheduler code (33), and the internal command processor code (80) in case of a CPC hard failure.

Because they do not need to communicate with the front-end processor, the scheduler, and server tasks can be reconfigured to reside in any CPC in the query processor complex. The query splitter can reside in any CPC in the query processor complex that has a high-speed channel connection to the front-end system.

Database queries from end users are processed by a query-receiver (16) running in the front-end system. The appropriate database queries (as described in FIG. 4 and supporting text below) are sent to the query processor complex master processor (20A) via the high-speed channel connection (12). The queries are received by the master query processor and passed to the splitter function (31) that determines whether the database query can be efficiently split. If so, the database query is split up and scheduled (33) for processing so as to achieve maximum performance improvement; if not, the database query is submitted as-is to one of the CPCs (20B–20H) in the query processor complex via the high-speed channel connections among them (22A–22H). Server tasks in each CPC (32B–32H) take the database queries (either split or unsplit) and send them to the local database manager (30B–30H) for execution. The resulting answers are sent back to the query processor complex master processor (20A). After all the parts of a database query are processed, the answers are merged to form the final answer set and the results returned to the submitter (14) via the front-end system (16).

All the direct access storage device (DASD) database storage accessible to the query processor complex is accessible from any CPC in the complex via the high-speed channel connections (24A–24H) through the switches (23). That is, all the database storage is shared by all the systems in the query processor complex. In addition, all the DASD database storage is also accessible from the front-end system (the operations focal point) via high-speed channels (13).

End users of this embodiment do not connect directly to the query processor complex (11); instead, all queries come to the query processor complex through the front-end systems (10) via the high-speed channel connections (12). Similarly, all output is returned to the front-end systems and then directed back to the requester.

All the CPCs in the query processor complex are running a database manager (FIG. 3 at 30B–30H) that is operating in read-only mode. In this embodiment, the database manager is IBM DATABASE 2 (DB2) operating in a shared read-only data (SROD) configuration, a mode of operation provided in DB2 Version 2 Release 3 (see *DB2 General Information* (Current Release) IBM publication number GC26-4073); however, those skilled in the art will understand that the database manager (DBM) could be any hierarchical or relational database manager operating in read-only mode. This means that all of these processors can access shared database information in read-mode only. One of the front-end systems (10) runs a database manager program (17) that owns the database information and can update it.

All the database managers in the query processor complex and the database manager in the front-end processor are homogeneous; that is, they are all instances of the same database manager. In this embodiment, the DBMs are all instances of the IBM DATABASE 2 (DB2) database manager. The front-end system that runs the database manager that owns the database is the system that contains the external operations command processor (18). During normal query-processing mode, the query processor complex database is in read mode and cannot be updated. Read-mode operation allows the parallel execution of the split queries described earlier.

Periodically, the query processing is quiesced and the database information is updated by the front-end database manager (17) that owns the database. (The mechanism for switching to maintenance mode is described below under *"Database Maintenance"* and *"Database Mode Switching"*.) This update processing is done via batch utilities that are initiated by the system operator using the external operations command processor (18) as described below under "DATABASE MODE SWITCHING". The update processing uses the high-speed channel connections (13) from the front-end system (10) to the DASD (15) for faster update.

The query-receiver (16), splitter (31), scheduler (33), and server tasks (32B–32H) provide the linkage between the user application and the database managers (30B–30H) in the query processor complex. The choice of a query splitting technique is not critical for purposes of the present invention. One suitable technique is described in U.S. patent application "Method of Performing a Parallel Relational Database Query in a Multiprocessor Environment" Ser. No. 08/148,769, by J. L. Wolf, et al., filed on even date herewith and assigned to the assignee of the present invention; it is incorporated herein by reference.

Operator interaction with the query processor complex is minimal. All normal operations are controlled by the internal command processor (80) running in the master query processor (20A) and the external operations command processor (18) running in the front-end system. Operator commands change the state of the query processor complex; all subordinate operations are handled by the external operations command processor (18). In this embodiment, the external operations function is conventionally controlled by IBM's NETVIEW and the internal operations function is controlled by Automated Operator Console/Multiple Virtual Storage (AOC/MVS) (see *NETVIEW SOLUTIONS AUTOMATED OPNS/MVS GENERAL INFORMATION* IBM publication number GC27-9118 and *AOC/MVS Overview*, IBM publication number GC28-1092).

Returning again to FIG. 1 to detail the operation of the elements introduced below:

The computer system on the left (10) is referred to as the front-end system. The query processor complex (11) is shown on the right.

In this embodiment, all end users (14) are attached to the front-end system (all queries originate on the front-end system). Queries are received by the query receiver (16) in the front-end system (10) from the end users (14) who attach to the front-end system via fixed-function terminal, work station, local area network (LAN), or server connection to a communications network via such protocols as system network architecture (SNA), open system interconnection (OSI), or transmission control protocol/internet protocol (TCP/IP).

Figure 4:
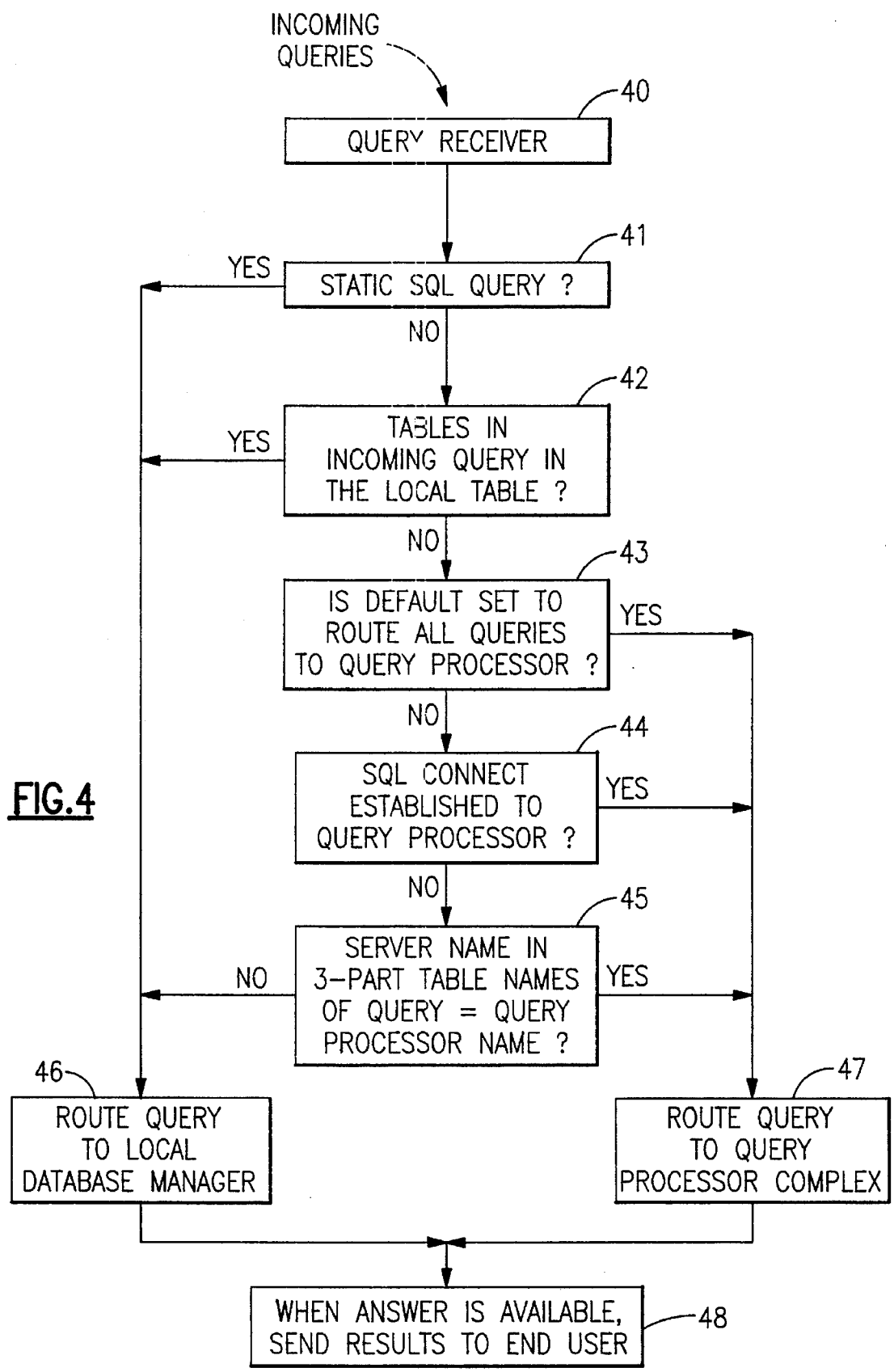
FIG. 4 is a flowchart showing logic flow in the front-end system.

Queries are processed either on the front-end system (10) by the local database manager (17) or are passed to the query processor complex (11) for processing. The logic of choosing which database manager will process an individual query is also illustrated in FIG. 4 and is explained in detail below. Work is introduced into the query processor complex

(11) through the front-end to query processor complex connection (12).

High speed channel connections (13) called the "maintenance line" exist from the front-end system to all of the database storage DASD (15). Alternatively, those skilled in the art will understand that the high-speed channel connections from the front-end system to all of the database storage DASD (15) can be made through the switch (23), as shown in FIG. 1 (13A). Database maintenance operations which are well known (such as database reorganization and database import/update) are performed by the front-end system via the high speed channel connections (13) to the database storage (15). System maintenance (for example, software update) is performed for the entire system via the front-end system (10).

The front-end system (10) is the external focal point for operations (18). That is, the front-end system is the point from which the entire query processing system is operationally controlled. In this embodiment, hardware operations commands are signaled to the query processor complex via the local area network (LAN) (19) to which the front-end system and all the central processing complexes (CPCs) of the query processor complex are attached. Any signaling method can be used that is appropriate to the type of control necessary to manage the system resources. One such method, for example, is shown in U.S. patent application "AUTOMATED/CENTRALIZED CONTROL OF PROCESSOR HARDWARE OPERATIONS" by K. Fitzgerald, et al., Ser. No. 07/577,967 filed Sep. 4, 1990, and assigned to the assignee of the present invention. This application is incorporated herein by reference.

Software operations commands are signaled via the high-speed channel connection (12) to the internal command processor residing in the query processor complex (11).

Operations commands of both types are initiated by the system operator at the operator console (20).

FIG. 2, as has been noted, shows the hardware structure of the query processor complex (11) of FIG. 1 in more detail. The query processor complex comprises eight CPCs (20A–20H) in this embodiment. The eight CPCs are interconnected by high speed channels (22A–22H) via a switch/channel-to-channel connection (CTC) (21) for the purpose of distributing queries to be processed by the CPCs, for gathering the answers to the queries, and for internal command processing and control purposes. The local database managers (30A–30H) in the eight CPCs access the database storage facility (15) via high speed channels (24A–24H) through switches (23). The eight CPCs are also interconnected by a LAN (19) for the purposes of operations of the CPC hardware. The primary master CPC (20A) and the alternate master CPC (20E) are connected to the front-end system via a high speed channel (12).

Figure 3:
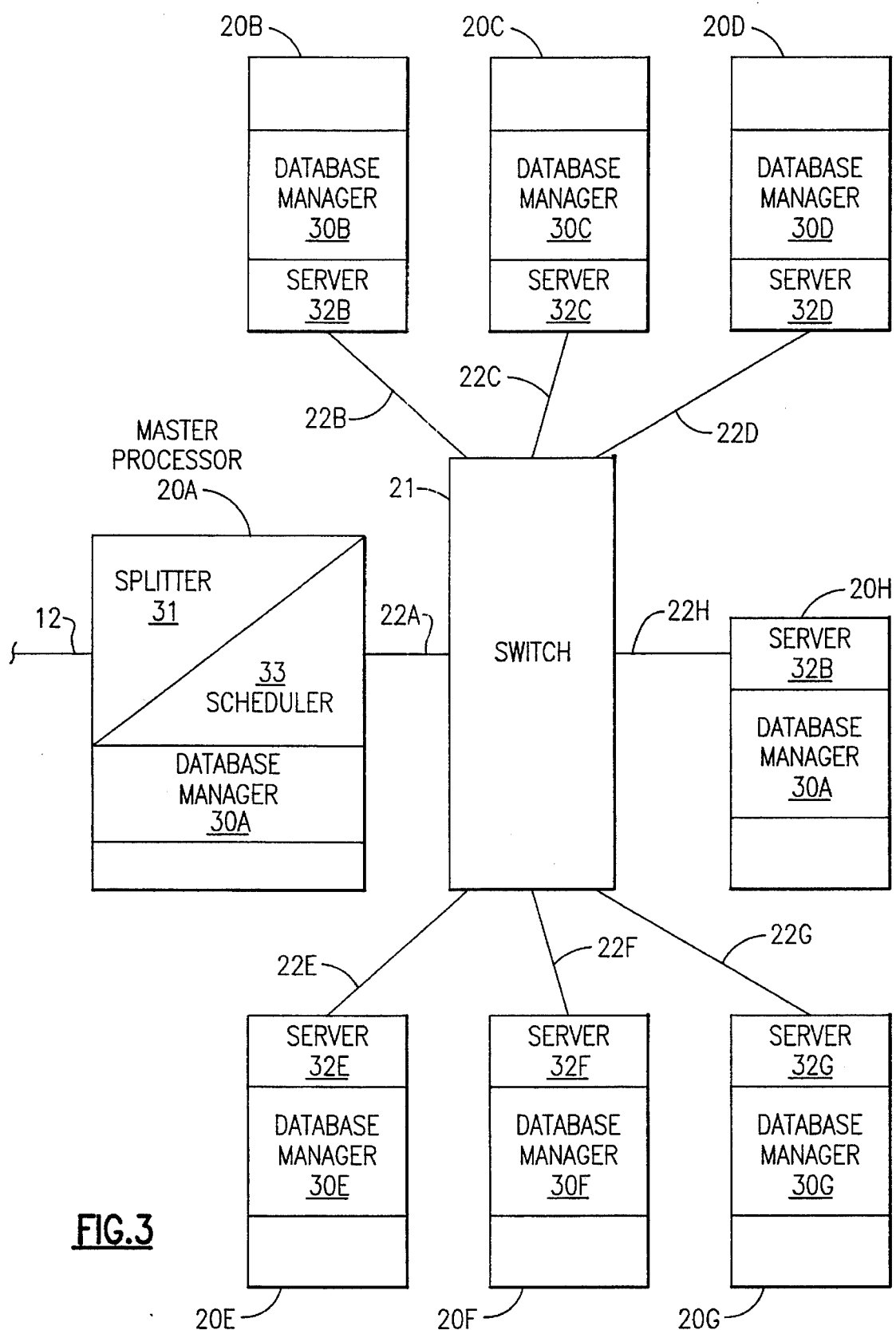
FIG. 3 is a block diagram showing the query processing logic configuration for the query processor complex of FIG. 2.

FIG. 3 shows the query processing logic configuration within the query processor complex embodiment shown in FIG. 2. A query is sent to the master processor (20A) via the high speed channel (12) from the front-end processor (10). The splitter (31) receives the query and, if possible, splits it into multiple queries. The resulting queries are then passed to the scheduler (33) which schedules them for processing on an appropriate slave processor (20B–20H) so as to minimize the total time spent processing the original query.

The scheduler then sends the split queries to the assigned slave processors via the high speed channel connections (22A–22H) through switch (21).

One query splitter method, as has been noted, is detailed in the aforementioned "Method of Performing a Parallel Relational Database Query in a Multiprocessor Environment", by J. L. Wolf, et al. The choice of a scheduling function is not critical for purposes of the present invention. One suitable function is described in U.S. Patent Application "Task Scheduler for a Multiprocessor System" Ser. No. 08/148,108 by J. L. Wolf, et al., filed on even date herewith and assigned to the assignee of the present invention. It is incorporated herein by reference.

The slave processor servers (32B–32H) receive the split queries and submit them to their local database managers (30A–30H) for processing. (Note: the master processor also serves in a slave capacity for processing split queries, as workload permits.) As the split queries are processed, the servers (32A–32H) send the result back to the splitter (31).

Figure 8:
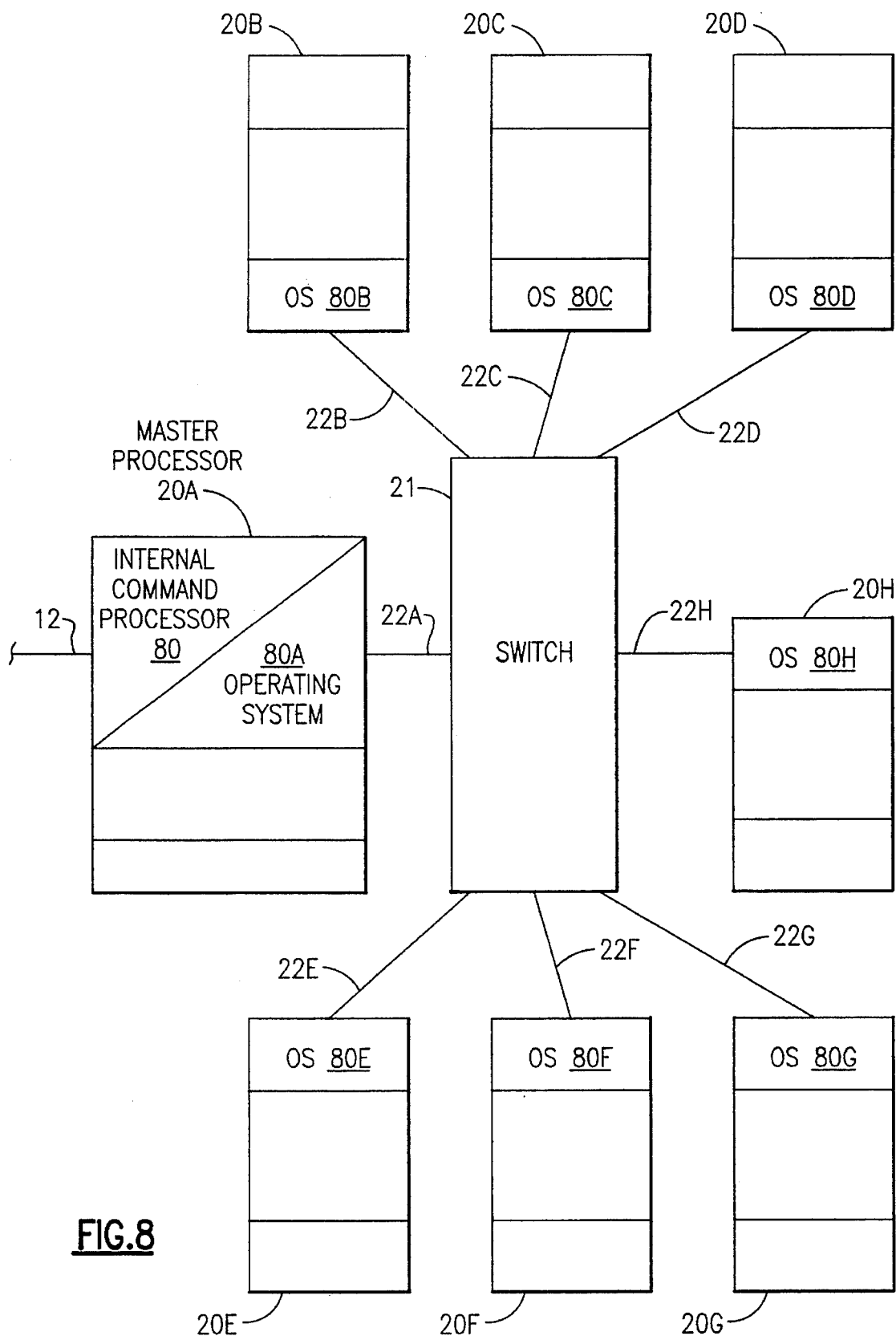
FIG. 8 is a block diagram showing the internal operations logic configuration for the query processor complex of FIG. 2.

FIG. 8 shows the internal operations command processor (80) configuration for the query processor complex embodiment of FIG. 2. An operations command is sent to the master processor (20A) via the high-speed channel (12) from the front-end processor (10)(18) The internal command processor (80) processes the command request and uses the facilities of the operating system (80A) on the master query processor to communicate lower level operations requests to the various components, including but not limited to the operating systems (80A–80H), database managers (30A–30H), database servers (32B–32H), the query splitter (31), and the query scheduler (33) to carry out the requested operation. Responses to the operations commands flow back to the internal command processor (80) over the same facilities.

The facilities of the operating system (80A) are also used by the internal command processor (80) to start, stop, ascertain the status of the various software components, and restart or recover them, if necessary. Status information is provided back to the external operations command processor (18) via the high-speed channel (12) from the internal command processor on both a solicited and unsolicited basis.

FIG. 4 shows the high-level logic flow in the front-end system. Incoming queries are received by the query receiver (40). A series of tests of the query are made that are peculiar to the type of query and the type of database that the system supports. For example, the embodiments of FIGS. 1, 2 and 3 support dynamic structured query language (SQL) queries against an IBM DB2 database and the appropriate tests for such a system are shown in steps (40) through (45).

First (41), only dynamic SQL queries are supported by the query processor complex, so static SQL queries are handled by the local database manager. Next (42), the query is tested to determine whether it specifies a table that is managed by the local DBM. If not, then if the default handling is set to route all queries to the query processor complex, the query is so routed (43) (47). If not, then if an SQL connect has been established to the query processor complex, the query is so routed (44) (47). If not, then if the server name specified in the three-part table names of the query is the same as the query processor name, then the query is so routed (45) (47); otherwise, the query is routed to the local DBM (46).

The result of the tests is the decision to either send the query to the front-end local database manager (46) for processing because it is not the type of query that is appropriate for processing by the query processor complex or to send the query to the query processor complex (47) for processing. In either case, the query receiver (40) returns the result (413) to the end user (14) after it has been processed.

Figure 5:
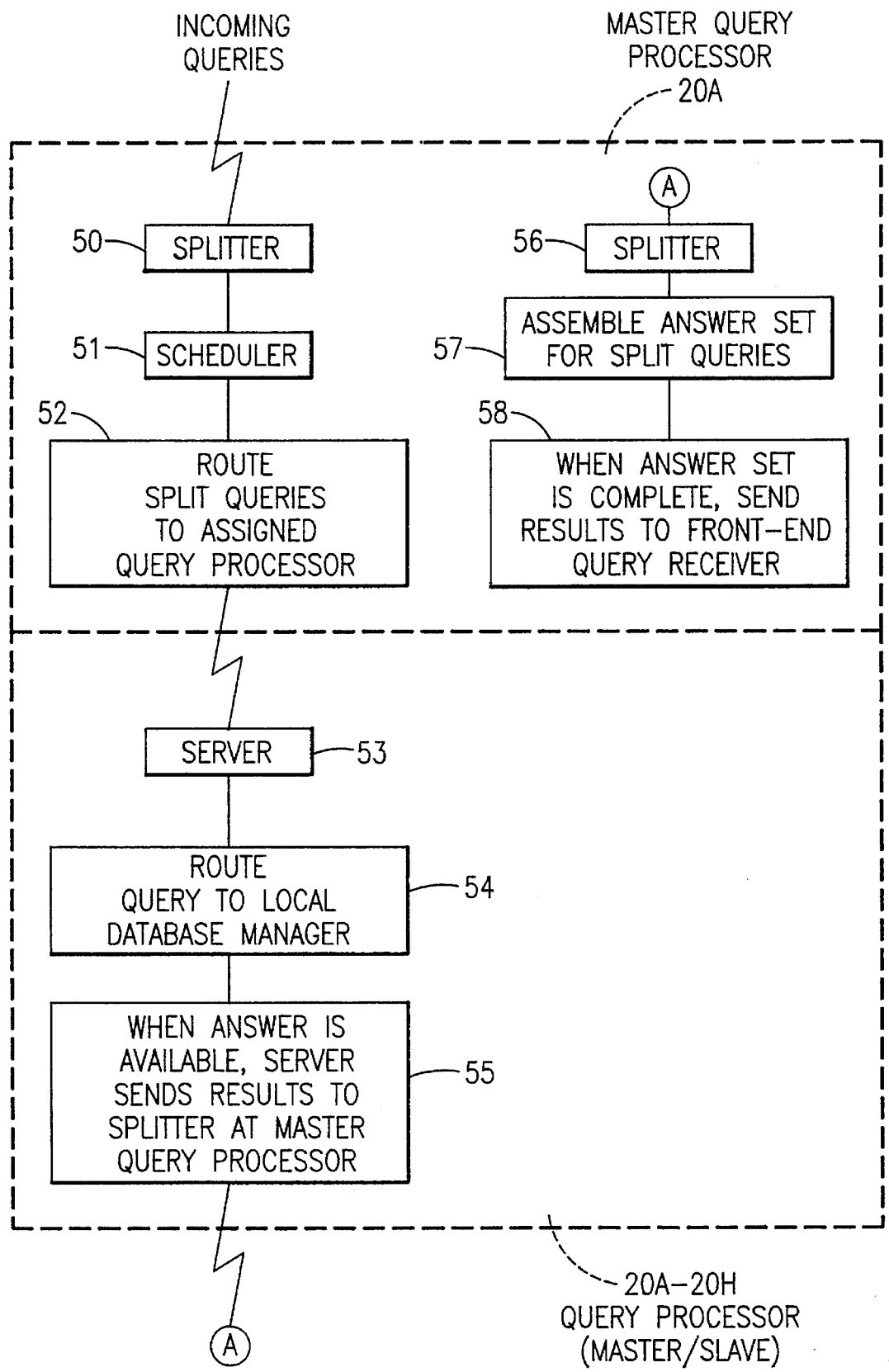
FIG. 5 is a flowchart showing logic flow for the query processor complex.

FIG. 5 shows the high-level logic flow for the query processor complex. Incoming queries are received from the front-end processor by the splitter function (50). The splitter (50) receives the query and, if possible, splits it into multiple queries according to a query splitting technique such as the one incorporated by reference above.

The scheduler function (51) schedules the split queries for processing on an appropriate slave processor so as to minimize the total time spent processing the original query. (A scheduling function such as the one incorporated by reference above may be chosen.)

The scheduler then sends the split queries to the assigned slave processors (52).

A slave processor server (53) receives the split query and routes it to its local database manager (54) for processing. Database managers are well known. This embodiment uses the IBM DAtABASE 2 (DB2) database manager in all instances. (Note: the master processor also serves in a slave capacity for processing split queries, as workload permits.) The slave server receives the result from the local database manager (55) and sends the result back to the splitter (56) in the master query processor. The splitter assembles the answer set from all the split-query results (57) and sends the completed answer set back to the front-end processor query receiver (58).

DATABASE MAINTENANCE

The system of the present invention is a shared read-only data (SROD) complex consisting of a front-end system that is the database owner, and a query processor complex comprising one or more interconnected, cooperating CPCs that are the database readers. In this system, the database itself is maintained only by the owner system, but tuning and definitions for such things as database, index, and authorization must be performed on every system in the complex.

Database maintenance procedures are permitted only during a maintenance mode period, during which query processing is stopped. Front-end system procedures initiated by the system operator switch the query processor complex between query processing mode and maintenance mode. These procedures perform the required database state switching, connection of logical paths, and control of query-splitting processes.

DATABASE MODE SWITCHING

Database maintenance mode is started and ended by the installation through the use of the BEGIN_UPDATE (FIG. 6) and END_UPDATE (FIG. 7) procedures. Database mode switching is part of the processing performed by BEGIN_UPDATE and END_UPDATE operations commands.

The commands are communicated from the front-end external operations command processor as shown in FIG. 1 (18) to the command processor internal to the query processor complex as shown in FIG. 8 (80) through the high speed channel connection (12). Lower level derivative commands are then communicated from the internal command processor (80) to the other software components through the various operating systems (80A–80H) as shown in FIG. 8.

The front-end system is the focal point for system operations, as shown in FIG. 1 (18). Once the query processor complex has been put into stop mode and the front-end database manager (17) has been put into read/write mode by BEGIN_UPDATE, the database manager (17) then performs the required import/update or other database maintenance function on the database.

Figure 6:
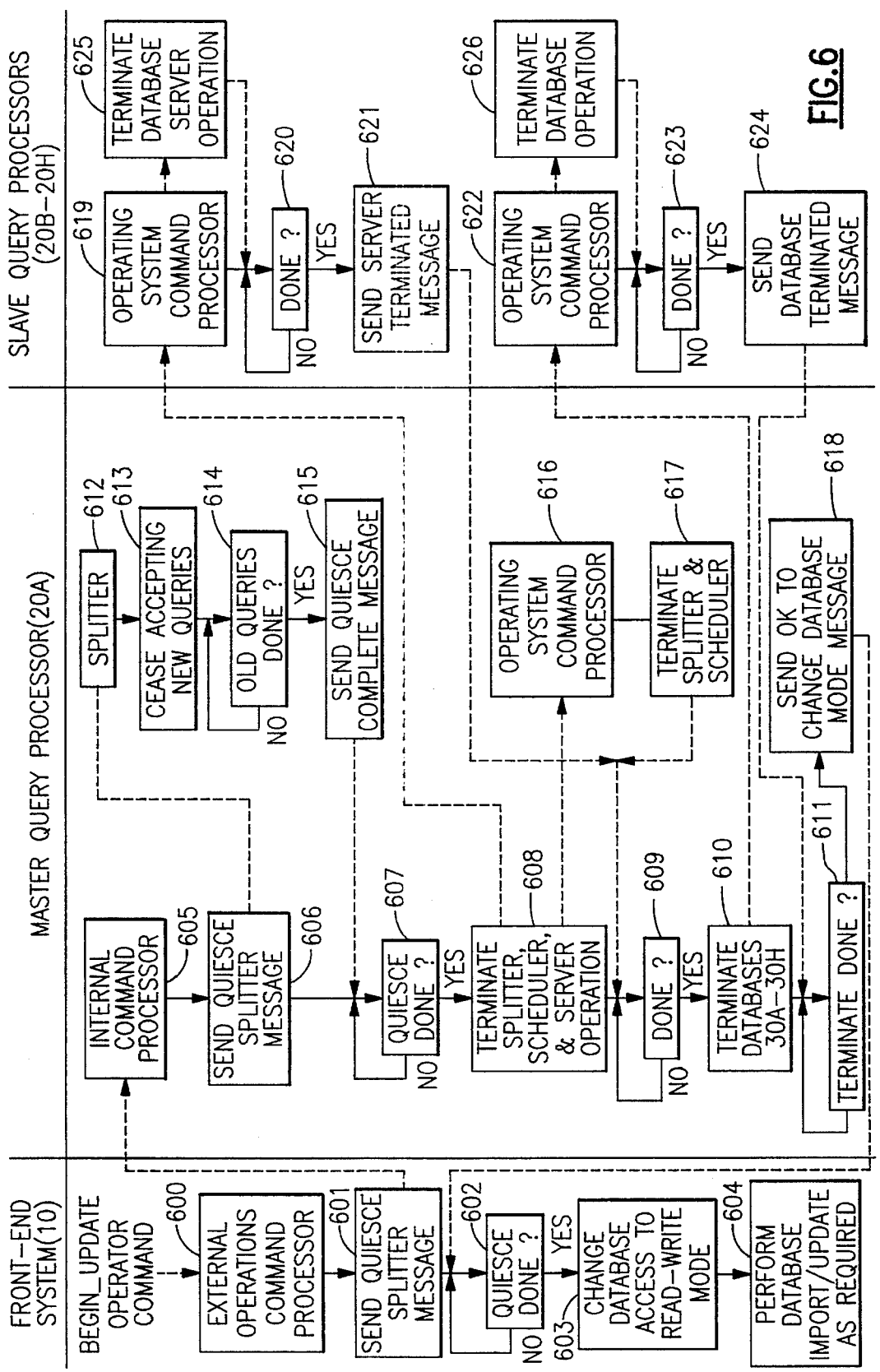
FIG. 6 is a flowchart showing logic flow for the BEGIN_UPDATE procedure.
Figure 7:
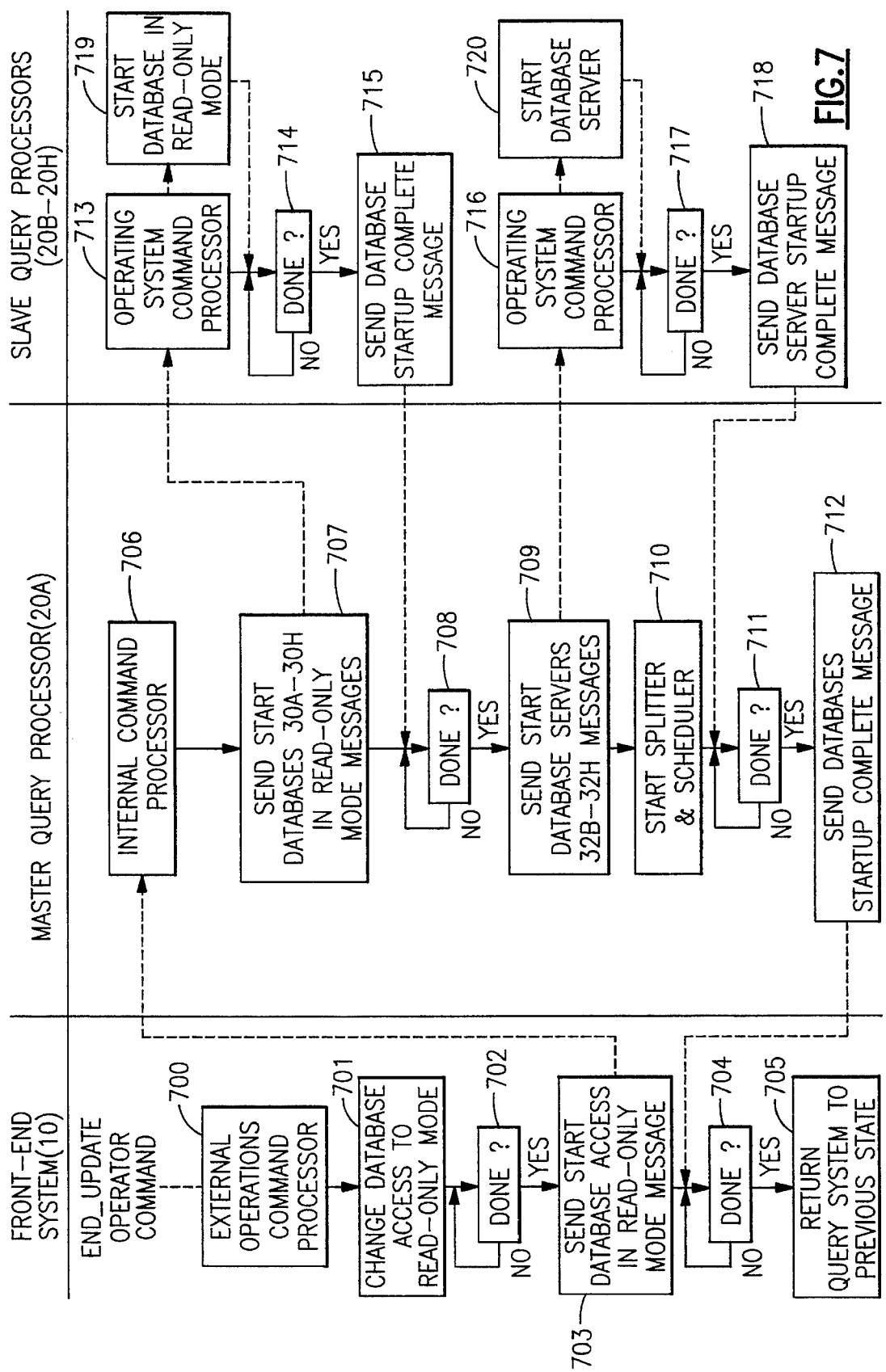
FIG. 7 is a flowchart showing logic flow for the END_UPDATE procedure.

The BEGIN_UPDATE procedure is shown schematically in FIG. 6. The external operations command processor receives the BEGIN_UPDATE command from the system operator (600). The first operation (601) is to quiesce the query splitter so that no new queries are accepted but queries in process are allowed to complete. The embodiment shown in FIGS. 1, 2 and 3, for example, uses the NetView-based external operations command processor (18) on the front-end system to issue a command (601) to the AOC/MVS-based internal command processor (605) residing on the master query processor (20A). The internal command processor in turn issues a command (606) through the underlying operating system (80A) to the query splitter (612) requesting that it cease accepting new queries (613) and signal when all of the existing queries have completed processing.

When all existing queries have been processed by the scheduler and the database servers (32B–32H) (614), the splitter signals the internal command processor (615) by way of a message that all query activities have completed. The message is conveyed by underlying operating system services and is captured by the internal command processor (607).

The internal command processor then terminates (608) the operation of the splitter, scheduler and database servers (32B–32H) by issuing commands through the underlying operating system services (616) to terminate the splitter and scheduler (617) and routes commands to the other operating systems (619) requesting that the various database servers terminate. Each of these terminations (625), when complete (620), results in the production of a message (621) which is routed by the underlying operating system services to the operating system of the master processor which is captured and processed by the internal command processor (609).

When the internal command processor detects that the splitter, scheduler and database servers have terminated (609), the databases are stopped on all the processors of the query processor complex (610). In the embodiment shown in FIGS. 1, 2 and 3, the internal command processor uses the underlying operating system to route commands to the other operating systems (622) requesting that they start a special batch procedure (626) for shutting down the various databases. In this embodiment, this special batch procedure uses the DB2 batch interface to stop all of the databases on the query processor complex using the DB2

STOP DATABASE (*) SPACENAM(*)

command. Because the DB2 batch interface is used to do this, DB2 will not return control to the batch procedure until all of the databases have been stopped or have explicitly failed. When it receives control back (623), the batch procedure will issue a message indicating that the databases have either been stopped or have failed (624).

Each of these messages is passed within the query processor complex by underlying operating system services and is captured by the internal command processor (80) on the master processor (20A). When the internal command processor detects that all the database managers in the query processor complex have been stopped (611), the internal command processor issues a message to the front-end processor (618) to start the front-end database manager in read/write mode (602, 603).

In this embodiment, the internal command processor (80) uses the high speed channel connection to send a command to the front-end external operations command processor (18) requesting that a batch procedure to change the front-end database mode be started. The batch procedure searches the DB2 catalog to identify all of the table spaces and indexes associated with the query complex databases and uses the DB2 batch interface to change the operating mode of all of the table spaces and indexes on the front-end system by issuing DB2

START DATABASE (database_name) SPACENAM(table_name)
    ACCESS(RW)

commands on the front-end system. Use of the batch interface ensures that the database operating mode has been changed before control is returned to the batch procedure. When control is returned, the batch procedure issues a message indicating that all of the query processor complex-related databases are now in read-write mode on the front-end processor. This message is trapped by the external operations command processor (18) on the front-end which sets the UPDATING state and terminates.

The system is then ready to perform all database maintenance activities (604).

When the database maintenance activities have been completed, the front-end database manager is placed in read-only mode and the query processor complex is restored to query processing via the END_UPDATE procedure. The END_UPDATE procedure is shown schematically in FIG. 7.

The END_UPDATE procedure begins by switching the database manager of the front-end processor (10)(17) to read-only mode (701). In this embodiment, this switching is initiated by the external operations command processor (700) when it receives the END_UPDATE command from the system operator. The switching is accomplished by having the external operations command processor (18) start a batch procedure on the front-end system by issuing a command to the underlying operating system. The batch procedure searches the DB2 catalog to identify all of the table spaces and indexes associated with the query complex databases and uses the DB2 batch interface to change the operating mode of all of the table spaces and indexes on the front-end system by issuing DB2

START DATABASE (database_name) SPACENAM(table_name)
    ACCESS(RO)

commands on the front-end system. Use of the batch interface ensures that the database operating mode has been changed before control is returned to the batch procedure. When the batch procedure terminates, the external operations command processor (18) starts the database managers in read-only mode on all the CPCs in the query processor complex. In this embodiment, when control is returned, the batch procedure issues a message indicating that all of the query processor complex-related databases are now in read-only mode on the front-end system; this message is trapped by the external operations command processor (18) on the front-end system (702) which then issues a command (703) by way of the high speed channel to the internal command processor (706) located on the master processor (20A) requesting that the databases be put into the proper mode and the software necessary to process queries be started.

The internal command processor (80) responds to the command from the external operations command processor (18) by starting a batch procedure on each system within the query processor complex (707). It does so by using the underlying operating system services to route a command to each of the other operating systems (713) requesting that they start the batch procedure. The internal command processor then waits for database startup to be complete (708). The batch procedure uses the DB2 batch interface to start all of the databases within the query processor complex by issuing the DB2

START DATABASE (*) SPACENAM (*) ACCESS (RO)

command (719). Use of the batch interface ensures that the databases have been started before control is returned to the batch procedure. When control is returned (714), the batch procedure issues a message (715) indicating that all of the databases have been started.

When all the query processor complex database managers have been started in read-only mode (708), the master query processor is enabled for receiving queries from the front-end processor. In this embodiment, the start of all query processor database managers is recognized by trapping the message indicating that all of the databases have been started. This message is passed within the query processor complex by operating system services and is trapped by the internal command processor (708) which then proceeds to start the database servers (709), the scheduler and the splitter (710). It does so by utilizing the underlying operating system services to issue the commands to start the scheduler and splitter and to route the commands to the other operating systems (716) to start the various database servers (720). After each database server is started (717), a startup complete message (718) is sent back to the master query processor.

After all the database servers (32B–32H) have been started (711), the internal command processor (80) completes its involvement by issuing a message (712) which is forwarded to the front-end system where it is trapped by the external operations command processor (18) (704) which then sets the system state to what it was before the BEGIN_UPDATE operation was initiated (705).

While we have described our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method for processing complex read-only queries in parallel, said method comprising the steps of:

a) Sending an end_update command to an external operations command processor in a front end processor to cause one or more slave central processors complexes (CPCs) in a query processor complex to operate in read-only mode;

b) initiating a complex read-only query on said front end processor;

c) routing said complex read-only query to a master CPC in said query processor complex;

d) splitting said complex read-only into two or more query elements and scheduling each of said two or more query elements for execution by one of the one or more slave CPCs, each one of said slave CPCs independently executing a database management system, each one of said CPCs comprising each of said one or more slave CPCs being capable of accessing any part of a database using a slave channel means;

e) forwarding a set of results of said two or more query element executions back to said master CPC reassembling the set of results into a combined final result and forwarding the combined final result back to said front-end processor.

2. The method of claim 1 further comprising the steps of a) sending a begin_update command to said external operations command processor in said front end processor to cause said one or more slave CPCs in said query processor complex to cease query processing;

b) initiating an import/update function on said database by said front end processor, using a maintenance channel path.

3. A system for parallel processing of complex read-only queries comprising:
   a) a front-end processor comprising:
      i) an interface means for identifying said complex read-only queries and routing them to a query processor complex, said interface means routing queries not identified as complex read-only queries to a local database manager means;
      ii) said local database manager means for processing database queries and updating a database, said local database manager means comprising import/update function processor means for performing database import/update functions on said database non-concurrently with complex read-only queries of said database by said query processor complex;
      iii) at least two connection paths: a first path for transporting, to said query processor complex, said read-only complex queries identified by said interface means, and a second path for communication with said database by said import/update function means;
      iv) external operations command processor means for ensuring the integrity of said read-only complex queries in response to a command procedure issued by a system operator, wherein said command processor ensures the integrity of said read-only complex queries by disabling their execution by a query processor database manager means prior to enabling said database import/update functions;
   b) said query processor complex comprising:
      i) a multi-CPU processor (MP), connected to said front-end processor by said first path and connected to said database by a channel means;
      ii) splitter means, executable on said MP, for splitting one of said read-only complex queries into two or more query elements, said splitter means further comprising a reassembly means for reassembling a set of results of said two or more query elements into a combined final result;
      iii) scheduler means, executable on said MP, for scheduling each of said two or more query elements for processing by said MP;
      iv) said query processor database manager means, executable on said MP, for processing any of said two or more query elements;
   c) a data repository means for storing said database, said data repository means being connected to said MP by said channel means, and connected to said front-end processor by said second path.

4. The system of claim 3 in which said query processor complex further comprises internal command processor means, executable on said MP, responsive to said external operations command processor means, for receiving a disable request from said front-end processor and transmitting a related request to said slave processor database manager means.

5. A system for parallel processing of complex read-only queries comprising:
   a) a front-end processor comprising:
      i) an interface means for identifying said complex read-only queries and routing them to a query processor complex, said interface means routing queries not identified as complex read-only queries to a local database manager means;
      ii) said local database manager means for processing database queries and updating a database, said local database manager means comprising import/update function processor means for performing database import/update functions on said database non-concurrently with complex read-only queries of said database by said query processor complex;
      iii) a first path for transporting, to a master central processor complex (CPC), said read-only complex queries identified by said interface means, and a second path for communicating with said database by said import/update function means;
      iv) external operations command processor means for ensuring the integrity of said read-only complex queries in response to a command procedure issued by a system operator, wherein said command processor ensures the integrity of said read-only complex queries by disabling their execution by a slave processor database manager means prior to enabling said database import/update functions;
   b) said query processor complex comprising:
      i) said master CPC, controlled by an operating system and executing a database management system, said master CPC connected to said front-end processor by said first path, connected to one or more slave CPC's by a first master channel means, and connected to said database by a second master channel means;
      ii) splitter means executable on said master CPC for splitting one of said read only complex queries into two or more query elements, said splitter means further comprising a reassembly means for reassembling a set of results of said two or more query elements into a combined final result;
      iii) scheduler means, for scheduling each of said two or more query elements for processing by said one of one or more slave CPCs;
      iv) said one or more of said slave CPCs, each one of said slave CPCs controlled by an operating system and each one of said slave CPCs comprising first slave channel means for communicating with said master CPC, and second slave channel means for accessing any portion of said database;
      v) said slave processor database manager means, executable on each of said one or more of said slave CPCs, for processing any of said two or more query elements;
   c) a data repository means for storing said database, said data repository means being connected to said master CPC by said second master channel means, connected to said slave CPCs by said second slave channel means, and connected to said front-end processor by said second path.

6. The system of claim 5 in which said scheduler means is executable on said master CPC.

7. The system of claim 5 in which said scheduler means is executable on any of said one or more slave CPCs.

8. The system of claim 5 in which said query processor complex further comprises server means, executable on each of said one or more slave CPCs, for receiving said query elements from said master processor and assigning them to said slave processor database manager means.

9. The system of claim 5 in which said query processor complex further comprises internal command processor means, executable on said master CPC and responsive to said external operations command processor means, for receiving a disable request from said front-end processor and transmitting a related request to said slave CPC.

10. The system of claim 5 in which one of said one or more slave CPCs, termed an alternate master CPC, further comprises third slave channel means for communicating with said front-end processor.

* * * * *